US006959112B1

(12) United States Patent
Wagman (10) Patent No.: US 6,959,112 B1
(45) Date of Patent: Oct. 25, 2005

(54) METHOD FOR FINDING A PATTERN WHICH MAY FALL PARTIALLY OUTSIDE AN IMAGE

(75) Inventor: Adam Wagman, Framingham, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 730 days.

(21) Appl. No.: 09/895,369

(22) Filed: Jun. 29, 2001

(51) Int. Cl.[7] .......................... G06K 9/00; G06K 9/48; G06K 9/62
(52) U.S. Cl. ...................... 382/181; 382/199; 382/216; 382/154
(58) Field of Search .............................. 382/181, 199, 382/209, 216, 151, 289, 291, 154

(56) References Cited

U.S. PATENT DOCUMENTS

| | | |
|---|---|---|
| 3,069,654 A | 12/1962 | Hough |
| 3,816,722 A | 6/1974 | Sakoe et al. |
| 3,898,617 A | 8/1975 | Kashioka et al. |
| 3,936,800 A | 2/1976 | Ejiri et al. |
| 4,115,762 A | 9/1978 | Akiyama |
| 4,200,861 A | 4/1980 | Hubach et al. |
| 4,441,205 A | 4/1984 | Berkin et al. |
| 4,672,676 A | 6/1987 | Linger |
| 4,955,062 A | 9/1990 | Terui |
| 5,003,166 A | 3/1991 | Girod |
| 5,020,006 A | 5/1991 | Sporon-Fiedler |
| 5,040,231 A | 8/1991 | Terzian |
| 5,086,478 A | 2/1992 | Kelly-Mahaffey |
| 5,168,530 A | 12/1992 | Peregrim et al. |
| 5,177,559 A | 1/1993 | Bachelder et al. |
| 5,226,095 A | 7/1993 | Okumura et al. |
| 5,253,306 A | 10/1993 | Nishio |
| 5,313,532 A | 5/1994 | Harvey et al. |
| 5,384,711 A | 1/1995 | Kanai et al. |
| 5,513,275 A | 4/1996 | Khalaj et al. |
| 5,537,669 A | 7/1996 | Evans et al. |
| 5,550,763 A * | 8/1996 | Michael et al. ............. 702/155 |
| 5,568,563 A | 10/1996 | Tanaka et al. |
| 5,586,058 A | 12/1996 | Aloni et al. |
| 5,602,937 A | 2/1997 | Bedrosian et al. |
| 5,613,013 A | 3/1997 | Schuette |

(Continued)

FOREIGN PATENT DOCUMENTS

JP        7-37893        4/1995

OTHER PUBLICATIONS

Wallack, Aaron, "Algorithms and Techniques for Manufacturing," University of California at Berkeley, 1995, pp. 97-335.*

(Continued)

*Primary Examiner*—Bhavesh M. Mehta
*Assistant Examiner*—Shefali Patel
(74) *Attorney, Agent, or Firm*—Russ Weinzimmer (57) ABSTRACT

A method is provided for finding a whole pattern in an image, where at least a portion of the whole pattern falls outside the boundary of the image. The method includes, for each candidate pose of a search model of the whole pattern that results in a transformed search model that may extend beyond the boundary of the image, applying a match-quality metric to only a subset of search model features and corresponding image features, the subset being uniquely determined by the pose. The features which do not overlap the image at that pose of the model are completely excluded from the metric computation. All the relevant available information is used, using no arbitrarily hypothesized information. The higher-level strategy of the search procedure is free to consider poses where the model extends partially outside the image, and the results of each metric computation will be the most true value possible.

11 Claims, 7 Drawing Sheets

U.S. PATENT DOCUMENTS

| | | |
|---|---|---|
| 5,627,915 A | 5/1997 | Rosser et al. |
| 5,708,731 A | 1/1998 | Shimotori et al. |
| 5,717,785 A | 2/1998 | Silver |
| 5,825,913 A | 10/1998 | Rostami et al. |
| 5,835,622 A | 11/1998 | Koljonen et al. |
| 5,848,189 A | 12/1998 | Pearson et al. |
| 6,002,793 A | 12/1999 | Silver et al. |
| 6,005,978 A | 12/1999 | Garakani |
| 6,023,530 A * | 2/2000 | Wilson ................ 382/219 |
| 6,035,066 A | 3/2000 | Michael |
| 6,067,379 A | 5/2000 | Silver |
| 6,154,567 A * | 11/2000 | McGarry ................ 382/219 |
| 6,246,478 B1 * | 6/2001 | Chapman et al. ........ 356/397 |
| 6,385,340 B1 * | 5/2002 | Wilson ................ 382/218 |
| 6,532,301 B1 * | 3/2003 | Krumm et al. ........... 382/170 |
| 6,625,303 B1 * | 9/2003 | Young et al. ........... 382/132 |

OTHER PUBLICATIONS

Cognex MVS-8000 Series CVL Vision Tools Guide, Version 5.4, 2000, pp. 25-136.

* cited by examiner

METHOD FOR FINDING A PATTERN WHICH MAY FALL PARTIALLY OUTSIDE AN IMAGE

FIELD OF THE INVENTION

This invention relates to machine vision systems, and more particularly, to techniques for finding a pattern in an image.

BACKGROUND OF THE INVENTION

In many applications, it is necessary to determine the location or, more generally, the pose (multi-degree-of-freedom position) of an object in a scene using machine vision, and various techniques exist for performing such a search. Such techniques generally involve a method for systematically visiting a plurality of locations in an image, and at each location visited, performing a computation using a model and a match-quality metric. The match-quality metric represents the quality of the match between the model at that location (pose) in the image and the pattern in the image. For example, one commonly used match-quality metric is normalized (cross) correlation, which computes a score between equal-sized regions of two images using a particular formula, such as the formula on page 653 of Pratt, *Digital Image Processing*, $2^{nd}$ Ed., Wiley-Interscience. A simple high-level algorithm might compute the normalized correlation metric at all translations of the model image where the model image would fit entirely within the image of the scene, and the location would be the translation at which the score was greatest.

A limitation that is typical of many pattern location algorithms, and of normalized-correlation-based pattern location algorithms in particular, is an inability to find the correct location if the object is not entirely contained within the field of view, and thus only part of the pattern occurs in the image.

A fairly simple way to work around this limitation is to somehow extend the original image, where the amount of extension determines the range of additional candidate locations that could be compared. The image might be extended in a number of ways, e.g., by filling the extra region with pixels of a constant value or with pixels representing a periodic repetition of the image. However, these techniques suffer from the fundamental limitation that the match-quality metric will eventually be applied to pixel data which are not truly meaningful, thus leading to misleading match-quality metrics at these locations, and consequently to a possibly incorrect location found by the overall search algorithm.

For example, consider the technique of extending the image by appending pixels of a constant value, and using normalized correlation as the metric. Even for a location where the model correctly matches the portion of a pattern that falls within the image, the normalized correlation match-quality metric will return a reduced value, because the region of the image that includes the pixels of a constant value usually does not match the portion of the model that extends beyond the image. It is similarly possible to report an abnormally high value if the model does happen to have a constant region at its border.

In general, the metric is applied to the model at a given location (pose) in the image, where the pose may consist of just a translation, or may include additional degrees of freedom, such as rotation, scale, aspect, and shear, for example. In this general case, the search algorithm usually generates a set of possible poses of the model, and applies the metric at each pose. The usual limitation is that only poses of the model wherein the entire model overlaps the image can be considered. In the typical normalized correlation approach, the set of poses that would be considered would be all translations in integer pixel increments such that the model still falls within the image. Note that even when using normalized correlation as the metric, it is possible to consider more general poses, typically by digitally transforming the model (or image) pixels according to the pose (e.g., by rotating, scaling, and/or shearing), in addition to translations of the model.

However, known approaches degrade or fail when the model extends beyond the boundary of the image, providing incorrect locations of the model.

SUMMARY OF THE INVENTION

A general aspect of the invention is a method for finding a whole pattern, where at least a portion of the whole pattern falls within the boundary of an image. The method includes, for each candidate pose of a search model of the whole pattern that results in a transformed search model that may extend beyond the boundary of the image, applying a match-quality metric to only a subset of search model features and corresponding image features, the subset being uniquely determined by the pose. In a preferred embodiment, the subset of model features is determined in accordance with at least a portion of the boundary of the image. In a further preferred embodiment, the subset of model features falls within an overlap region of the transformed search model and the image. The features can be pixels, edge elements, or higher level features, such as geometric features.

In another general aspect, the invention is a method for finding a whole pattern, where at least a portion of the whole pattern falls within the boundary of an image. The method includes, for each candidate pose of a search model of the whole pattern that results in a transformed search model that may extend beyond the boundary of the image, computing a match-quality score by considering only features of the transformed search model that overlap the image. In a preferred embodiment, at least some of the features of the transformed search model that overlap the image also abut at least a portion of the boundary of the image. Again, the features can be pixels, edge elements, or higher level features, such as geometric features.

In a further general aspect, the invention is a method for finding a pattern which may fall partially outside an image. The method includes providing a search model, the search model having a boundary. Then, providing an image, the image having a pattern at least partially contained within the boundary of the image. Next, performing a search strategy for systematically generating a sequence of poses of the search model, some of the poses possibly resulting in a partial overlap of the search model and the image. Then, computing a match-quality metric for each pose in the sequence of poses to provide a plurality of metric results, and then using the plurality of metric results to determine the pose of the pattern in the image. In a preferred embodiment, computing the match-quality metric includes computing the overlap region in the model and the overlap region in the image using the pose, the model boundary, and the image boundary. The metric is computed using the model features within the overlap region in the model, and the image features within the overlap region in the image.

In accordance with the principles of the present invention, the set of model pixels, or more generally model features, which overlap the image given a specified model pose are determined, and the metric is computed using only the set of such overlapping model features. The features which do not overlap the image at that pose of the model are completely excluded from the metric computation. In this way, all of the relevant available information (where the model and image overlap) is used, and no arbitrarily hypothesized information (the supposed contents of the image outside of the actual given image) is used. Thus, the higher-level strategy of the search procedure is free to consider poses where the model extends partially outside the image, and the results of each metric computation will be the most true value possible.

In a preferred embodiment, the match-quality metric is correlation (sometimes called "cross correlation"), and can be either normalized or not. In some preferred embodiments, the features are pixels, and the set of poses to be considered consist only of translations, the values of the translations being quantized, and measured as some integer value of a number of pixels. For these embodiments, there are a number of efficient techniques for computing the metric, especially if the set of poses is evaluated in a certain sequence, such as successive adjacent poses.

In another embodiment, the metric used is correlation, whether normalized or not, the features used are the pixel values, and an arbitrary set of poses may be considered.

In another embodiment, the metric used is the least-squares fitting error, the features used are higher-level features such as edges, and an arbitrary set of poses may be considered.

BRIEF DESCRIPTION OF THE DRAWINGS

The invention will be more fully understood from the following detailed description, in conjunction with the following figures, wherein.

DETAILED DESCRIPTION

Figure 1:
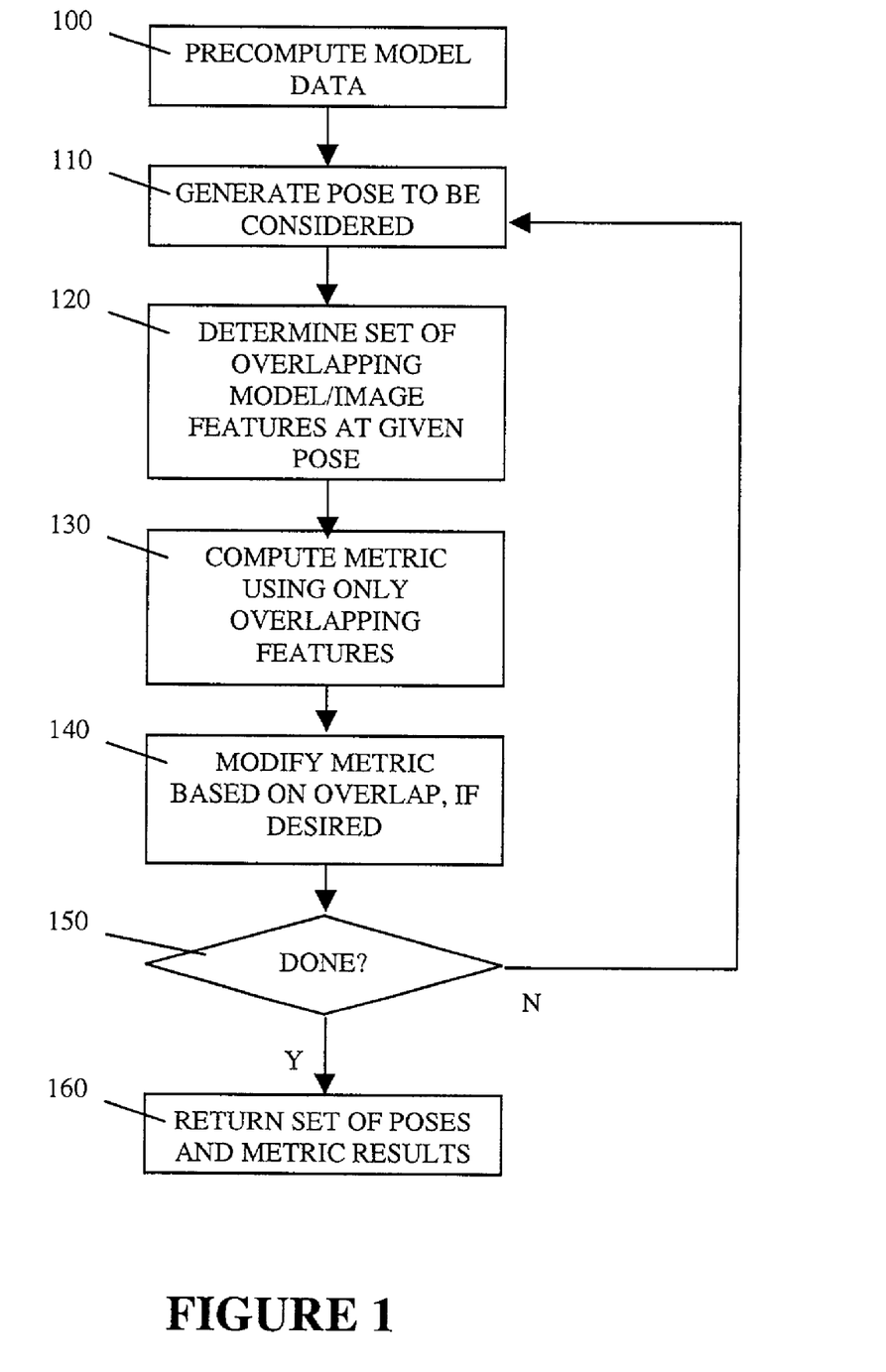
FIG. 1 is a flowchart illustrating the steps for determining a set of optimal model poses in accordance with the principles of the invention.

FIG. 1 is a flow diagram for the method of locating a pattern in an image using a model according to the present invention. The process begins with step 100, wherein some information about the model may be precomputed, although not all metrics require such precomputation. This type of precomputation is sometimes referred to as "training". For example, when using correlation as the metric, it is typical to precompute the sum of all model pixels and the sum of the squares of all model pixels. When correlation is to be used with rotation and scale as possible degrees of freedom in the search method that selects the poses to be evaluated using the metric, one might pre-generate rotated and scaled models. For other metrics, one might also perform some sort of feature extraction, such as performing edge detection. Some metrics may not require any precomputation. For example, one can do correlation with no precomputation, but usually doing the precomputation decreases execution time at runtime.

The process then continues with step 110, where a pose is generated for consideration. A pose is a mathematical transformation from coordinates in the model to coordinates in the image (and vice versa). If we represent coordinates in the model as $(x, y)$ and coordinates in the image as $(x', y')$, then a pose P is a function (or other mapping) where $(x', y')=P(x, y)$ For example, if the pose represents a translation $(x_0, y_0)$, then $(x', y')=P(x, y)=(x+x_0, y+y_0)$ If the pose P represents a combination of a translation $(x_0, y_0)$, rotation $\theta$, scale S, aspect A, and shear K, then $(x', y')=P(x, y)=M(\theta, S, A, K)*(x, y)+(x_0, y_0)$ where M can be represented as a 2×2 matrix and the multiplication indicates multiplication of that matrix by the column vector $(x, y)$, yielding $x'=(S \cos \theta)x+AS(-\sin \theta-(\cos \theta)(\tan K))y$ $y'=(S \sin \theta)x+AS(\cos \theta-(\sin \theta)(\tan K))y$ There are many different possible pose generation strategies, and the present invention may be used with any of them. For example, a very simple strategy for the translation-only correlation case is to generate all poses at integer pixel translations such that the model at least partially overlaps the image. Without the present invention, note that one would typically be limited to considering the subset of such poses where the model completely overlaps the image. The goal of such "exhaustive" correlation is then to find the pose that generates the maximum correlation score, and that pose is reported as the location of the model. A more sophisticated strategy would use the match results for an intermediate set of poses to determine the next pose to be evaluated.

When we speak of a model pixel or feature "overlapping" the image, we mean that the image coordinate $(x', y')$, resulting from transforming the model coordinate $(x, y)$ by the pose P as described above, lies within the boundaries of the image. Typically the boundaries of the image are those of a rectangle, so that the test for whether $(x', y')$ lies within those boundaries is trivial for those skilled in the art. Note that an individual pixel actually occupies a range of coordinate values, but it usually suffices to represent the location of a pixel as the coordinate at its center, and to consider a pixel to be contained within a boundary if the center of the pixel is contained within the boundary.

The present invention allows whatever pose generation strategy is used to consider poses where the model lies partially outside the image. Typically, some additional information will be used to determine reasonable limits for the possible poses. For example, a user might specify that only up to 25% of the model may lie outside the image; such inputs allow users to use application-specific knowledge to obtain optimal results. Usually some restriction, beyond the minimal restriction that the model at least partially overlap the image, is required in order to obtain good results. For example, the maximum possible range allows consideration of a pose where just a single corner pixel of the model overlapped the image. However, a correlation metric would be undefined for such a pose, and so the pose would typically not be considered.

The precomputation phase of step 100 can also be used to analyze the spatial distribution of information in the model in order to determine the maximal range of poses that would allow for reliable application of the metric. For example, if a model consists of a uniform black square on a uniform white background, then it is clear that only poses for which at least part of the black square would overlap the image should be considered.

The strategy may present the poses in any order, but some orders may allow for more computationally efficient processing. As will be discussed later, it can be advantageous in the translation-only correlation embodiments for the poses to be adjacent, i.e., each pose being shifted by one pixel in either the x-direction or the y-direction.

In step 120, the pose is used to determine the set of pixels or other features of the model that overlap the image. In general, one could compute the image coordinate (x', y') corresponding to a model feature at model coordinate (x, y) using the pose P as discussed above and then test whether (x', y') was contained within the image boundaries. Also as discussed above, one typically uses the coordinate of the center of a pixel for the test. However, because the model boundary is typically a rectangle (or possibly a parallelogram after transformation by the pose) and the image boundary is typically a rectangle, the overlap region can be computed by simple geometry, as is known to those skilled in the art. According to the present invention, it is this use of only overlapping features which allows for the most accurate metric to be computed, and consequently for the optimal pose to be determined.

Also, it is typical to use the pose to determine the correspondence between features of the model and features of the image, by considering the model feature at location (x, y) to correspond to the image feature or features near (x', y'), where various definitions of "near" are possible, as is known to those skilled in the art. For example, one might take the correspondence to use only the single image feature closest to (x', y') within some maximum distance. Note that if the pose is just an integer-pixel translation, and if the features are pixels, then the correspondence is trivial, namely that the single image pixel located exactly at (x', y') corresponds to the model pixel located at (x, y). Not all metrics require the correspondence to be determined, but most do. Correlation is an example which requires correspondence, and histogram matching, wherein a histogram is computed for the model image and for each pose searched in the image, is an example which does not require correspondence. Also note that some metrics may use the pose to generate an initial correspondence, which may then be refined before applying the metric proper. For example, when performing least-squares fitting to feature positions, the pose will be used to determine a correspondence, and the fitting will produce a refined pose as well as the fitting error, where the fitting error is the actual metric. The refined pose could then be used to generate a refined correspondence (possibly after recomputing the overlap for the refined pose) and thus a refined error; this procedure could be iterated until some convergence criterion was met, as is known to those skilled in the art.

FIG. 2 is a sketch showing a number of possible translation-only poses of a model 170 with respect to an image 180. Each pose (1,2,3) is indicated in the diagram of FIG. 2A as a point in the image 180 at which the upper-left corner of the model should be placed.

Figure 2A:
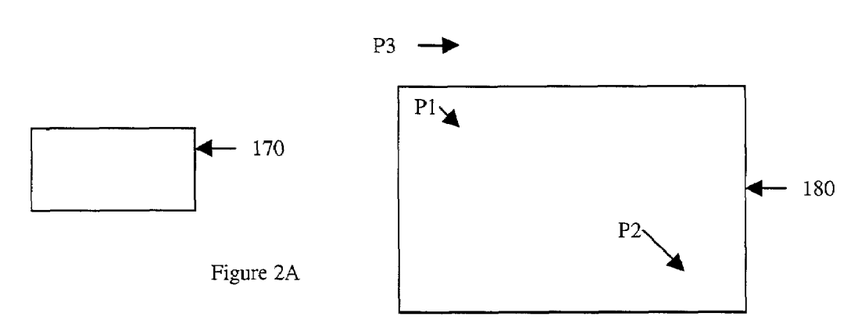
FIG. 2 is a diagram illustrating the overlapping image region for each of several translation-only poses of a model.
Figure 2B:
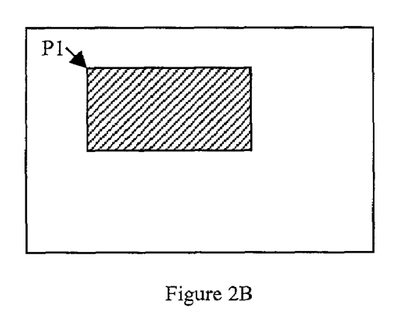

Pose 1 is an example of a pose for which the entire model lies within the image, as shown in FIG. 2B, and thus the set of overlapping features is the entire model, and the corresponding section of the image.

Figure 2C:
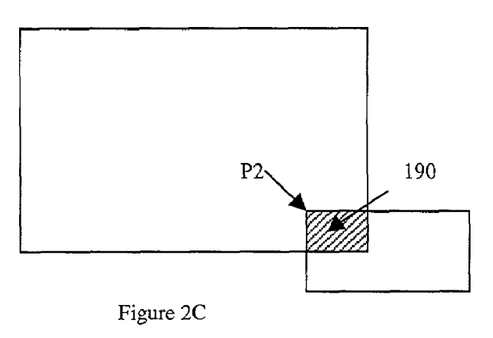

Pose 2 is a pose for which the model lies partially outside the image to both the right and down, as shown in FIG. 2C, with the overlapping region 190 shaded and including a corner of the image. Note that the overlapping region in the image is near the lower right of the image, while the overlapping region in the model is near the upper left of the model.

Figure 2D:
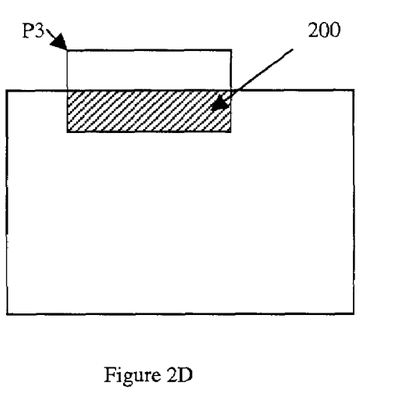

Pose 3 is a pose for which the model lies partially outside the image upwards, as shown in FIG. 2D, with the overlapping region 200 shaded and including just a linear boundary of the image.

The match-quality metric is applied only to the overlapping region, such as one of the regions 190 or 200, for example. Consider a metric such as correlation, for which each model pixel must correspond to a single image pixel. The model and image are typically rectangular sets of pixels; denote the model's width as $w_M$ and its height as $h_M$, and denote the image's width and height as $w_I$ and $h_I$, respectively. Denote each pixel in the model by M(x,y), where (x=0, y=0) is the upper-left corner of the model and (x=$w_M$−1,y=$h_M$−1) is the lower-right corner of the model; similarly, denote each pixel in the image by I(x,y), where (x=0, y=0) is the upper-left corner of the image and (x=$w_I$−1,y=$h_I$−1) is the lower-right corner of the image. For a given translation-only pose P=($p_x$, $p_y$), the model pixel M(x,y) corresponds to the image pixel I($p_x$+x, $p_y$+y). Assuming that the model is not larger than the image in either direction (i.e. $w_M \leq w_I$ and $h_M \leq h_I$), then it is clear that the poses in the range (0, 0) to ($w_I$−$w_M$−1, $h_I$−$h_M$−1), inclusive, specify poses for which the model is entirely contained within the image; such poses will be referred to as total-overlap poses.

Similarly, the complete set of all translation-only poses for which the model at least partially overlaps the image is the range (−$w_M$+1, −$h_M$+1) to ($w_I$−1, $h_I$−1), inclusive. Note that this range includes the set of all total-overlap poses. Poses in the larger set which are not in the total-overlap set will be referred to as partial-overlap poses. Note that the present invention also applies to cases where the model is larger than the image.

For a total-overlap pose, the metric is applied to the entire model and the corresponding set of image features. For a partial-overlap pose, the metric is applied only over the region where the model and image overlap. For the translation-only case discussed above, this region is always a rectangle; a given pixel is in the overlap region if (x, y) is in the range [(0, 0), ($w_M$−1,$h_M$−1)] and if ($P_x$+x, $p_y$+y) is in the range [(0, 0), ($w_I$−1,$h_I$−1)].

For clarity, let us consider two specific examples, where $w_M$=150, $h_M$=100, $w_I$=600,$h_I$=400. For the first example, let the pose be $p_x$=50, $p_y$=60, such as that illustrated for pose 1 in FIG. 2B. This is a total overlap case because the full rectangle of model pixels [(x=0, y=0), (x=149, y=99)] transforms to the rectangle of image pixels [(x'=50, y'=60), (x'=199, y'=159)], which is clearly contained within the full range of the image [(x'=0, y'=0), (x'=599, y'=399)]. For the second example, let the pose be $p_x$=500, $p_y$=340, such as that illustrated for pose 2 in FIG. 2C. In this case, the full rectangle of model pixels transforms to the rectangle of image pixels [(x'=500, y'=340), (x'=649, y'=439)], which is not completely contained by the full rectangle of the image. The overlap region in the image, which is the rectangle of image pixels contained within the boundaries of the image, is [(x'=500, y'=340), (x'=599, y'=399)], where the initial result has been clipped to the image boundaries, as will be clear to those skilled in the art. The overlap region in the model, which is the rectangle of model pixels corresponding to the overlap region in the image, is [(x=0, y=0), (x=99, y=59)].

Note that in the above examples we simply used the integer pixel coordinates for the case of an integer-pixel translation; when using a more general pose, and thus using real-valued coordinates, one would consider the model boundary to be the rectangle [(0, 0), (150, 100)] and the image boundary to be the rectangle [(0, 0), (600, 400)], and the centers of the model pixels would be used as the (x, y) values.

Figure 3A:
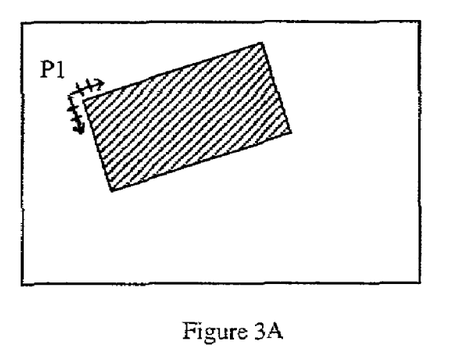
FIG. 3 is a diagram illustrating the overlapping image region for each of several model poses which include translation, rotation, and scale.
Figure 3B:
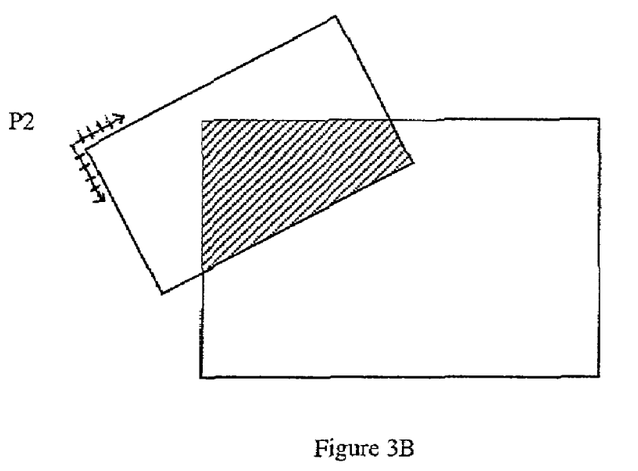
Figure 3C:
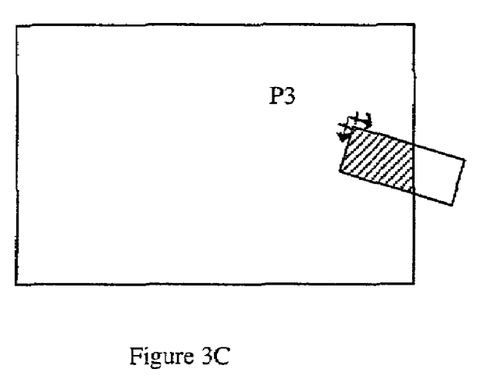

The present invention is not limited to translation-only poses. FIG. 3 depicts three poses (pose 1, pose 2, pose 3) which include rotation and scale in addition to translation. It will be clear to someone skilled in the art that computing the overlap region and correspondences, as shown in FIGS. 3A–3C in such a case is a matter of simple geometry. For correlation or other pixel-grid-based metrics, one would typically digitally transform either the model or the image, and then perform the overlap and correspondence calculations to the transformed model or image. For metrics which use features not so closely tied to the pixel grid, such transformation is typically fairly simple and computationally efficient.

Figure 4A:
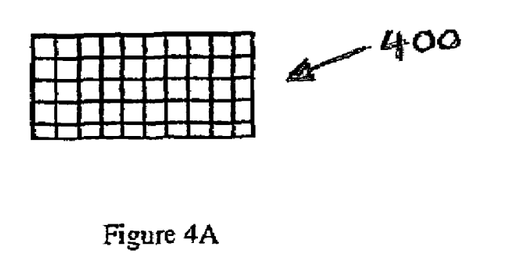
FIG. 4 is a diagram illustrating the rotation and scaling of a model.
Figure 4B:
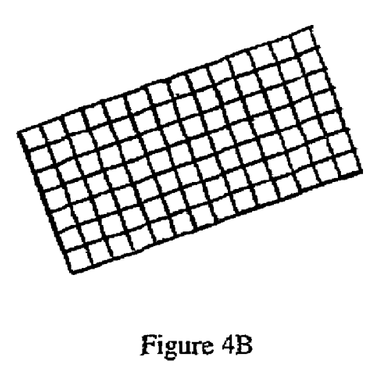
Figure 4C:
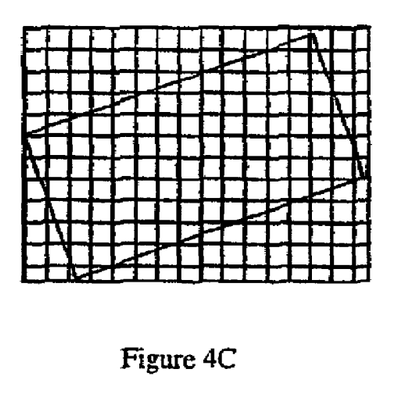

FIG. 4 includes an example of rotating and scaling a model from its initial pixel grid to a transformed one. FIG. 4A shows the original model. FIG. 4B shows the model after being scaled and rotated, with a grid 400 aligned with the model boundaries for clarity. FIG. 4C indicates that the resulting transformed model is stored in a new pixel grid which in general is no longer aligned with the model boundaries, and further indicates the enclosing pixel-grid-aligned rectangle that would typically be used to store the model. Note that it is common, although not necessary, to store a model as a rectangular array of pixels; because the transformed boundary of the model is also stored, only those pixels within the transformed boundary will ever be within a region of overlap with the image.

Pixels within the enclosing rectangle but not within the model boundaries are not part of the model, and are therefore not included in the overlap set that is used to compute the metric. For example, one might keep track of the coordinate of the start and end pixel of the overlap pixel set for each row of the transformed model. Alternatively, one might simply keep track of the rotated and scaled rectangle and then determine the overlap pixels when needed.

The pixels which are overlapping are those which lie within both the transformed model rectangle and the image rectangle; such an intersection is a convex polygon, and, as is known to those skilled in the art, testing the coordinate of a feature for containment within such a polygon is a simple matter. Note that, in general, one may transform either the model or the image, but that the model is typically transformed both because it is usually smaller, and because some information can be precomputed.

For features not tied to the quantized pixel grid, the situation is usually much simpler. Such features are usually represented sparsely by their (x, y) coordinates, instead of by an exhaustive set or grid of feature values at all possible (x, y) locations, so that it is trivial to determine if the transformed (x, y) coordinate lies within the rectangular image. However, for such sparse features, the correspondence may be less clear, since one may want to allow nearby features to correspond even if they do not have the exact same position. For example, one might want the correspondence to use the closest feature within some maximum distance; considerably more complicated correspondence schemes are certainly possible. The present invention can be applied to any such scheme, since a central principle of the invention is to gain improvements in accuracy and computational efficiency by excluding all but the features in the overlap region from being considered in the correspondence determination.

After the determination of the set of overlapping features and their correspondence in step 120, the metric is applied to those features, and only those features, in step 130. For correlation, this involves computing the sum of the model pixels, the sum of the squares of the model pixels, the sum of the image pixels, the sum of the square of the image pixels, the sum of the product of corresponding model and image pixels, and the number of model pixels, where the sum is performed only over the overlap region. Another metric that could be used is least-squares fitting error, where the fitting could allow various specified degrees of freedom; the possibilities include but are not limited to translation only, translation and rotation, translation and scale, or all three. Aspect and shear might also be included.

Many other metrics are also possible and within the spirit and scope of the invention. For example, the sum of the absolute value of the difference between model pixels and their corresponding image pixels can be used as a metric; various types of correlation are also possible, including normalized, absolute, and relative.

In step 140, the strategy might choose to modify the result of the metric based on the nature of the match, e.g. the extent to which the match is a partial one. For example, the strategy might consider the true result to be the metric multiplied by the percentage of the model used in the overlap calculation, or to be some more complicated function of the overlap percentage. It might also use the particular pose, especially when the information in the model is not uniformly distributed. For example, if the model is a cross, then a partial-overlap pose in which only part of one arm of the cross is in the overlap region may produce a fairly unreliable result. Alternatively, the strategy might use the raw result of the metric. The choice of whether and how to modify the raw result of the metric is usually application specific, and possibly model specific.

FIG. 5 includes a sequence of figures that illustrate an example of a model that presents a challenge to a search strategy. Consider, for example, the case where the model 500 consists of four identical evenly-spaced vertical bars, as shown in FIG. 5a. FIG. 5b shows an image in which only three evenly-spaced vertical bars are contained in the image 510. P1, P2, and P3 are partial-overlap poses of the model 500 which correspond to one, two, and three bars of the model 500 overlapping with the image 510, respectively. If the bars in the image 510 are a perfect match to those in the model 500, then it is likely that P3 is the desired optimal pose, even though all three poses are a perfect match using the unmodified metric. In this case, i.e. when no image degradation is expected, the strategy might choose to weight the raw result by the overlap percentage. Thus, in FIG. 5b, P3 would receive the most weight, since the overlap area is the greatest, and it would thus receive the heighest weighted metric result, since all three raw metric results are the same.

Figure 5A:
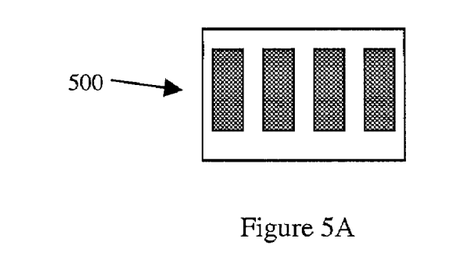
FIG. 5 includes a sequence of FIGS. $a$–$d$ illustrating a model with a repeated feature, and a set of images, each of which contain a partial instance of the model.
Figure 5B:
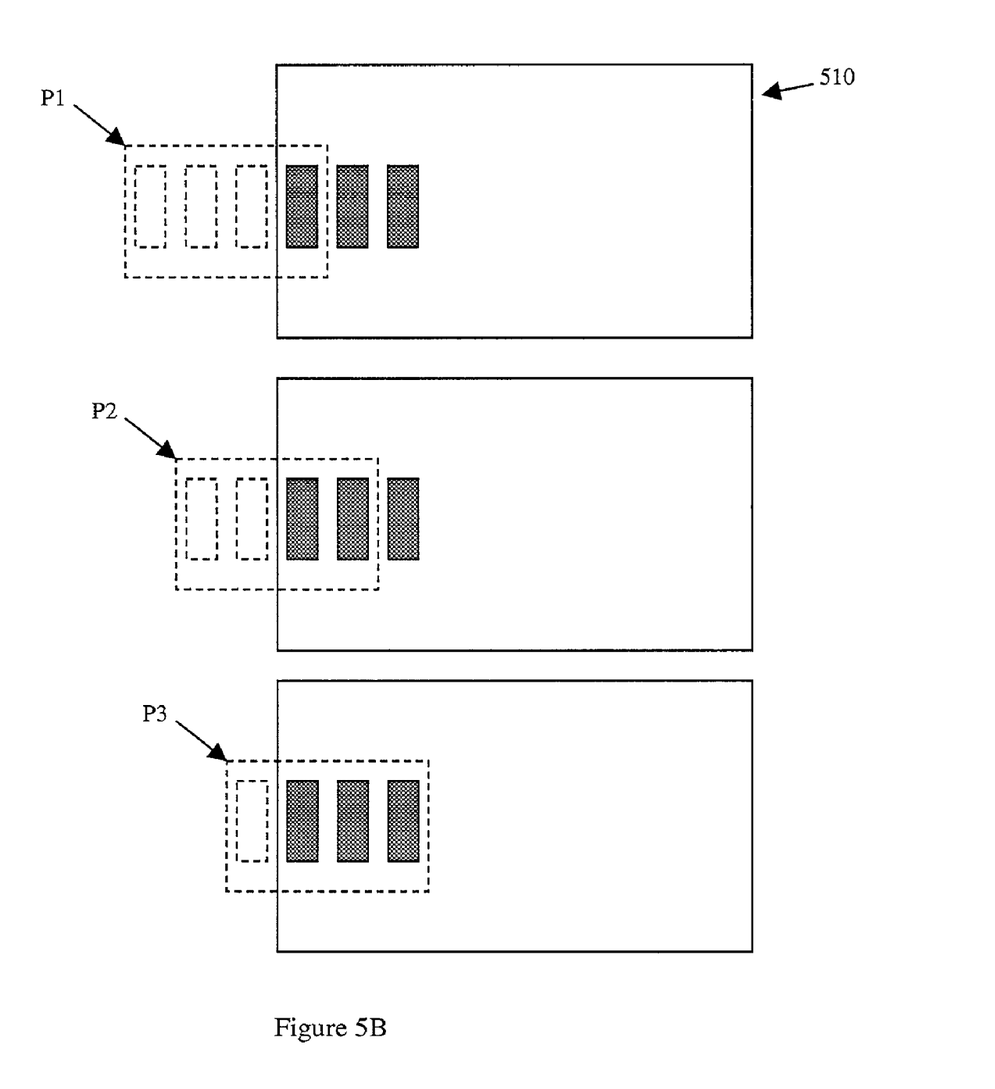
Figure 5C:
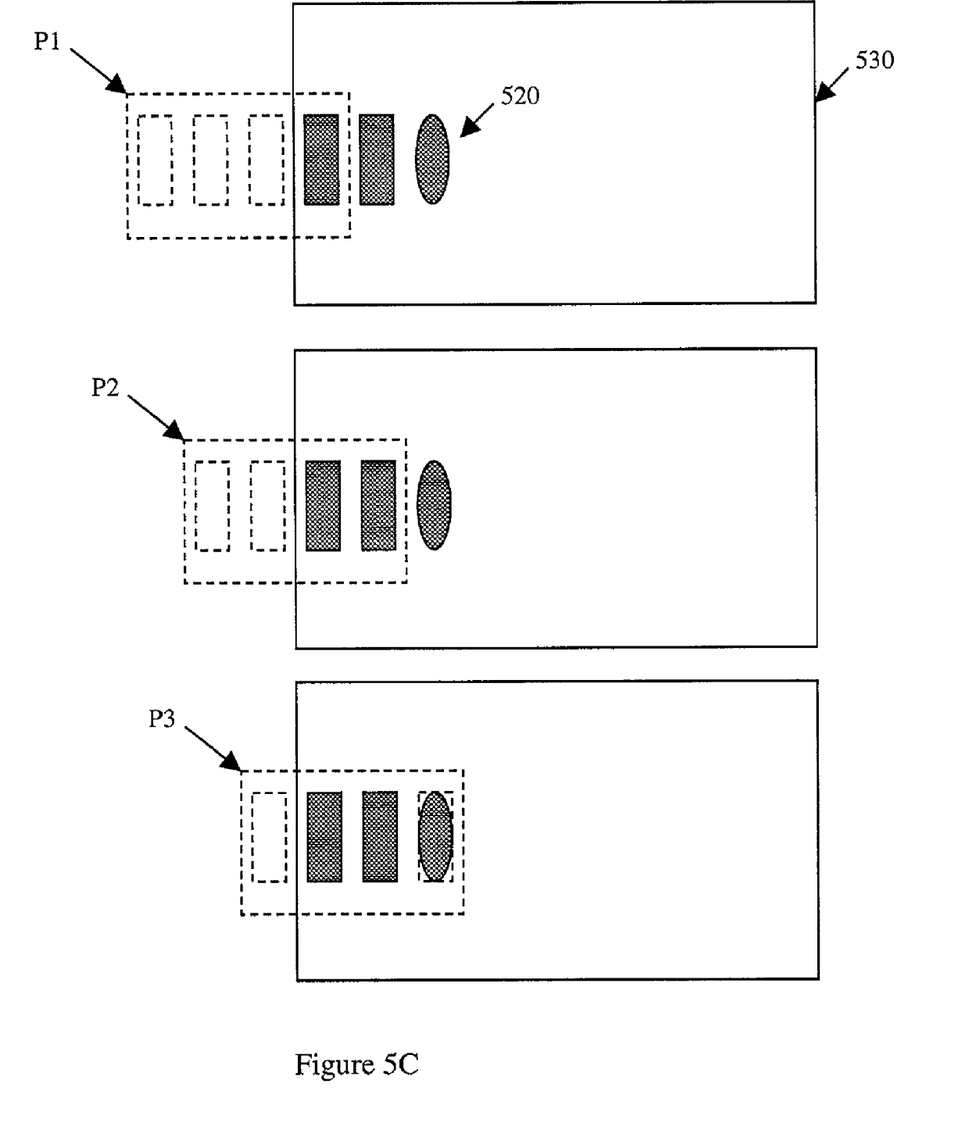

Alternatively, consider FIG. 5c, in which the third bar 520 in the image 530 is no longer a perfect match to the model, in that it is an oval instead of a rectangle. If such a "bar" is actually a degraded instance of a bar in the model, then P3 is probably still the desired optimal pose. If, however, such a bar is a confusing object, then P2 is probably the desired optimal pose in that it excludes the confusing object 520, and using the raw metric (or possibly weighting less heavily by the overlap percentage) would be preferable. However, if one uses the raw metric, P1 and P2 will seem equally good. There are a number of ways of dealing with this difficulty. If the user restricts the amount by which the model may lie outside the image, and if the restriction is chosen such that P1 would exceed this amount, then using the raw metric suffices. Alternatively, the raw metric might be weighted by a power of the overlap percentage, where that power is less than 1. The choice of final metric would probably depend on the expected probabilities of degraded images versus confusing objects.

Figure 5D:
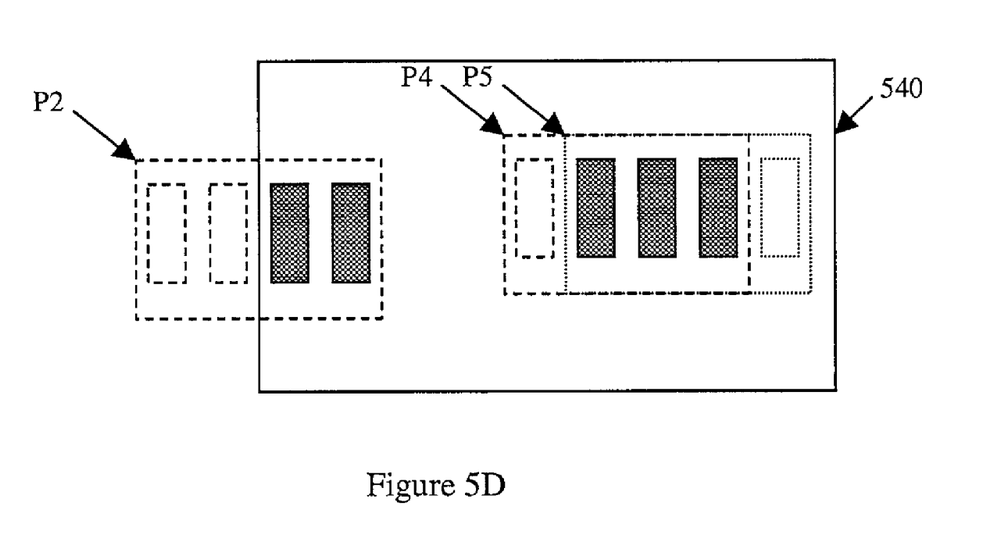

Also consider FIG. 5d, where one group of three vertical bars and one group of two vertical bars appear in the image 540. The group of three vertical bars is contained by the total-overlap region corresponding to total-overlap poses P4 and P5, and the group of two vertical bars is contained by the partial-overlap region corresponding to the partial-overlap pose P2. P4 and P5 are equally good, but note that this situation is different from P2. P2 is a perfect partial match because the contents of the overlap region in the image are identical to the contents of the overlap region in the model (two vertical bars in each), while P4 and P5 are imperfect total matches because the contents of the overlap region in the image contain only three bars, while the overlap region in the model [i.e. the entire model] contains four bars; it is likely that P2 is the desired result. To handle such cases, the strategy should use the unweighted metric.

Note that FIG. 5 represents a fairly pathological case, used to emphasize some of the choices one may need to make when choosing an overall search strategy and modified metric. Models which do not have such degeneracies (e.g., repeated elements) tend to make the particular choice of modified metric less critical.

In step 150, the search strategy decides whether to continue generating and analyzing poses, or to quit. For example, the strategy might choose to quit as soon as the metric for a pose exceeded a certain value, or it might choose to quit only when the complete set of all possible poses had been evaluated. If it chooses not to quit, execution returns to step 110, where the next pose is evaluated. If it chooses to quit, execution proceeds to step 160, where the desired results are returned. The desired result might be, for example, just the one pose for which the metric was a maximum, or the set of all poses for which the metric exceeded some value, or the set of all poses and their metrics. Typically, the optimal pose is the one for which the metric is a maximum.

It is worthwhile to consider how to efficiently implement the translation-only case for correlation. One will recall that the five values in the formula for normalized correlation are N (the number of model pixels in the overlap region [which is also the number of image pixels]), Sm (the sum of model pixels in the overlap region), Smm (the sum of squares of the model pixels in the overlap region), Si (the sum of image pixels in the overlap region), Sii (the sum of squares of image pixels in the overlap region), and Sim (the sum of the product of corresponding model and image pixels in the overlap region). For all total-overlap poses, N, Sm, and Smm are constant for a given model and are typically precomputed in step 100, thus leaving only the calculation of Si, Sii, and Sim to be evaluated for each total-overlap pose.

Figure 2E:
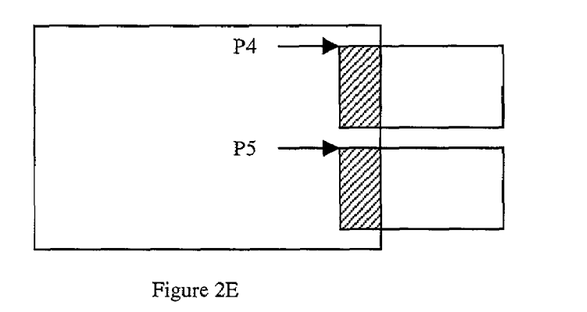

However, N, Sm, and Smm also vary for different overlap regions of the model and thus for different partial-overlap poses; note that it is possible for some different partial-overlap poses to correspond to the same overlap region in the model, as is illustrated by poses 4 and 5 in FIG. 2E. Thus a straightforward implementation will recompute all of these for each partial-overlap pose, causing execution time per pixel to increase substantially. N can be calculated trivially, since it is just the area of the overlap rectangle, but the per-pixel calculation will now include five additions and three multiplications instead of three additions and two multiplications. Note that the actual percentage increase in time can vary substantially depending on the computer chip instruction set and other factors, but it is clear that one can expect this straightforward minimal-precomputation approach to take approximately twice as long per pixel in the partial-overlap case compared to the total-overlap case. This minimal-precomputation approach is a reasonable one, but it is usually not the most efficient. Note that although one could use this approach to handle both partial-overlap and total-overlap cases, it is almost always desirable to treat the two separately for performance reasons. In the following discussion, it is assumed that the total-overlap case is always treated separately. [Thus we refer to this approach as "minimal-precomputation" instead of as "zero-precomputation", since we typically still precompute the model sums for the total-overlap case.]

There are a number of alternatives for more efficiently handling the partial-overlap cases. One could precompute Sm and Smm for all possible partial-overlap shifts. "Shift" is used to specify the set of model pixels that are in the overlap region, where the shift value is a unique label for each possible overlap region in the model; note that multiple poses may correspond to the same shift value. For example, all total-overlap poses correspond to a shift of (0, 0).

The shift can be represented by the pair $(s_x, s_y)$, where:

$s_x<0$ indicates that the overlap region in the model excludes the pixels for which x is in the range $[0, -s_x]$ (i.e. pixels at the left of the model are excluded).

$s_x>0$ indicates that the overlap region in the model excludes the pixels for which x is in the range $[w_M-s_x, w_M-1]$ (i.e. pixels at the right of the model are excluded).

$s_x=0$ indicates that the overlap region in the model includes all values of x in the range $[0, w_M-1]$ (i.e. all values of x within the model are included).

$s_y<0$ indicates that the overlap region in the model excludes the pixels for which y is in the range $[0, -s_y]$ (i.e. pixels at the top of the model).

$s_y>0$ indicates that the overlap region in the model excludes the pixels for which y is in the range $[h_M-s_y, h_M-1]$ (i.e. pixels at the bottom of the model).

$s_y=0$ indicates that the overlap region in the model includes all values of y in the range $[0, h_M-1]$ (i.e. all values of y within the model are included).

As a specific example, consider again the second example discussed above for FIG. 2C, where we determined that the overlap region in the model was $[(x=0, y=0), (x=99, y=59)]$, where the full region of the model was $[(x=0, y=0), (x=149, y=99)]$. The shift value used to represent this overlap region would be $(s_x=50, s_y=40)$.

In general, the shift value can be determined using the following procedure:

If $p_x<0$, then $s_x=p_x$,

Else if $p_x>w_I-w_M$, then $s_x=p_x-(w_I-w_M)$,

Else $s_x=0$

If $p_y<0$, then $s_y=p_y$,

Else if $p_y>h_I-h_M$, then $s_x=p_y-(h_I-h_M)$,

Else $s_y=0$

This formulation uses coordinate systems where (x=0, y=0) is the upper-left corner of the model and (x'=0, y'=0) is the upper-left corner of the image; generalization to other coordinate systems is straightforward for one skilled in the art.

The maximum set of shifts is $[(-w_M+1, -h_M+1), (w_M-1, h_M-1)]$, where a shift of $(0, 0)$ is the total-overlap case; the user might choose to further restrict this set, as discussed previously. In the maximal case, the number of possible shifts is $(2w_M-1)(2h_M-1)$, or approximately (for simplicity) $4w_M h_M$, i.e. four times the model area. If one considers the common case of an 8-bit [1 byte] model pixels and 32-bit [4 byte] values for Sm and Smm, then one would need approximately $4*(4+4)=32$ times as much memory to store the precomputed values as are required to store the model itself. If one uses 64-bit values (either large integers or double-precision floating point) for Sm and Smm, one needs 64 times as much memory. For most applications, this is not a practical approach, although it may certainly be reasonable when memory is plentiful or when the set of possible shifts is restricted, e.g. if the user wishes to allow the model to be shifted at most one or two pixels off the image. Both the minimal-precomputation approach and this maximal-precomputation approach are within the spirit and scope of the invention.

In a preferred embodiment, a balance is struck between these two extremes of precomputation by caching one or more sets of model sums for given shift values, representing the sums at poses previously requested by the strategy. In a typical case, the strategy usually generates successive poses at adjacent translations, or at least at nearby translations. For example, if one pose is $(p_x, p_y)$, it is quite common for the next pose to be $(p_x+1, p_y)$ or $(p_x, p_y+1)$; this is certainly the pattern used by a search strategy when performing exhaustive correlation, and often occurs in other schemes as well. For two such successive adjacent poses, the set of model pixels differs by at most one row (or column), and may actually not differ at all (i.e. the shifts may be the same). Thus, if one caches the sums used at the previous pose, one need only compute the model sums for that row or column and add or subtract them from the cached values. Such a scheme causes a much smaller increase in time per pixel than does the minimal-precomputation approach, since only one row needs to be reevaluated, and it has a negligible increase in required memory relative to that needed in the maximal-precomputation approach.

Note that this balanced approach generalizes to the case where the two successive poses differ by more than one pixel in one direction, or even if they differ in both directions simultaneously. One merely determines the set of pixels which differ between the model overlap regions implied by the two shift values, and then adds or subtracts the sums for that set from the cached sums. Note that if the two shifts differ substantially (especially if, e.g., $s_y$ is positive for one shift and negative for the other), it may be more efficient to simply recompute the sums from scratch at the new shift value.

A more complex caching scheme can certainly be used to choose a different tradeoff in speed and memory. For example, one might cache the last several sets of sums, or one might precompute in step 100 the sums for a set of evenly-spaced shift values so that the difference between any given pose and the closest cached pose would be relatively small. All such schemes are within the spirit and scope of the invention.

A software implementation of the above-described embodiment may comprise a series of computer instructions either fixed on a tangible medium, such as a computer readable medium, e.g. a diskette, a CD-ROM, a ROM memory, or a fixed disk, or transmissible to a computer system, via a modem or other interface device over a data communications medium. The medium either can be a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, although only a few strategies and metrics were explicitly discussed in the specification, those skilled in the art will appreciate that there are many other possible strategies and metrics that can be used for the purposes described herein. Use of any such embodiment for the purposes described herein is within the spirit and scope of the invention. Other aspects, such as the specific instructions utilized to achieve a particular function, as well as other modifications to the inventive concept are intended to be covered by the appended claims.

What is claimed is:

1. A method for finding a whole pattern, a portion of the whole pattern falling outside the boundary of an image, the method including:
   for each candidate pose of a search model of the whole pattern that results in a transformed search model that falls partially outside the boundary of the image, applying a match-quality metric to only a subset of search model features and corresponding image features, the subset being uniquely determined by the pose.

2. The method of claim 1, wherein the subset of model features is determined in accordance with at least a portion of the boundary of the image.

3. The method of claim 1, wherein the subset of model features falls within an overlap region of the transformed search model and the image.

4. The method of claim 1, wherein the model features are pixels.

5. The method of claim 1, wherein the model features include edge elements.

6. A method for finding a whole pattern, at least a portion of the whole pattern falling outside the boundary of an image, the method including:
   for each candidate pose of a search model of the whole pattern that results in a transformed search model that falls partially outside the boundary of the image, computing a match-quality score by considering only model features of the transformed search model that overlap the image, thereby ignoring model features of the transformed search model that fall outside the boundary of the image.

7. The method of claim 6, wherein at least some of the model features of the transformed search model that overlap the image also abut at least a portion of the boundary of the image.

8. The method of claim 6, wherein the model features are pixels.

9. The method of claim 6, wherein the model features include edge elements.

10. A method for finding a pattern which may fall partially outside a boundary of an image, the method comprising:
   providing a search model, the search model having a model boundary;
   providing an image, the image having an image boundary and a pattern only partially contained within the image boundary;
   performing a search strategy for systematically generating a sequence of candidate poses of the search model, some of the candidate poses possibly resulting in a partial overlap of the search model and the image;
   computing a match-quality metric for each candidate pose in the sequence of candidate poses to provide a plurality of metric results; and
   using the plurality of metric results to determine the pose of the pattern in the image.

11. The method of claim 10, wherein computing the match-quality metric includes:
   computing an overlap region in the search model and an overlap region in the image, thereby ignoring model features of the search model that fall outside the boundary of the image, using the candidate pose of the model, the model boundary, and the image boundary; and
   computing the metric using the model features within the overlap region in the model, and the image features within the overlap region in the image.

* * * * *

(12) INTER PARTES REEXAMINATION CERTIFICATE (598th)
United States Patent
Wagman (10) Number: US 6,959,112 C1
(45) Certificate Issued: May 10, 2013

(54) METHOD FOR FINDING A PATTERN WHICH MAY FALL PARTIALLY OUTSIDE AN IMAGE

(75) Inventor: Adam Wagman, Framingham, MA (US)

(73) Assignee: Cognex Technology and Investment Corporation, Mountain View, CA (US)

Reexamination Request:
No. 95/001,173, Apr. 24, 2009

Reexamination Certificate for:
Patent No.: 6,959,112
Issued: Oct. 25, 2005
Appl. No.: 09/895,369
Filed: Jun. 29, 2001

(51) Int. Cl.
*G06K 9/00* (2006.01)
*G06K 9/48* (2006.01)
*G06K 9/62* (2006.01)

(52) U.S. Cl.
USPC ............ 382/181; 382/199; 382/216; 382/154

(58) Field of Classification Search
None
See application file for complete search history.

(56) References Cited

To view the complete listing of prior art documents cited during the proceeding for Reexamination Control Number 95/001,173, please refer to the USPTO's public Patent Application Information Retrieval (PAIR) system under the Display References tab.

*Primary Examiner* — Colin Larose (57) ABSTRACT

A method is provided for finding a whole pattern in an image, where at least a portion of the whole pattern falls outside the boundary of the image. The method includes, for each candidate pose of a search model of the whole pattern that results in a transformed search model that may extend beyond the boundary of the image, applying a match-quality metric to only a subset of search model features and corresponding image features, the subset being uniquely determined by the pose. The features which do not overlap the image at that pose of the model are completely excluded from the metric computation. All the relevant available information is used, using no arbitrarily hypothesized information. The higher-level strategy of the search procedure is free to consider poses where the model extends partially outside the image, and the results of each metric computation will be the most true value possible.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-11 are cancelled.

\* \* \* \* \*